United States Patent [19]

Jones et al.

[11] Patent Number: 4,601,443
[45] Date of Patent: Jul. 22, 1986

[54] FREE FLYABLE STRUCTURE

[76] Inventors: Andrew W. Jones, September Cottage, High Street, Brinkley, Cambridge; Raymond Merry, 18 Orkney Close, Haverhill, Suffolk, CB9 OLS, both of United Kingdom

[21] Appl. No.: 617,091

[22] PCT Filed: Sep. 28, 1983

[86] PCT No.: PCT/GB83/00242
§ 371 Date: May 23, 1984
§ 102(e) Date: May 23, 1984

[87] PCT Pub. No.: WO84/01346
PCT Pub. Date: Apr. 12, 1984

[51] Int. Cl.⁴ .................................................. B64C 3/42
[52] U.S. Cl. ................................... 244/13; 244/90 R; 244/46; 244/45 R; 244/DIG. 12; 244/DIG. 13; 244/DIG. 14
[58] Field of Search .................. 244/13, DIG. 1, 90 R, 244/46, 48, 45 R

[56] References Cited

U.S. PATENT DOCUMENTS

| | | | |
|---|---|---|---|
| 1,022,903 | 4/1912 | Warrick | 244/DIG. 1 |
| 2,623,712 | 12/1952 | Spraff | 244/DIG. 1 |
| 3,135,483 | 6/1964 | Girard | 244/DIG. 1 |
| 3,507,464 | 4/1970 | Rogallo | 244/DIG. 1 |
| 4,129,272 | 12/1978 | Jones et al. | 244/DIG. 1 |
| 4,375,280 | 3/1983 | Nicolaides | 244/DIG. 1 |
| 4,424,945 | 1/1984 | Dell | 244/DIG. 1 |

*Primary Examiner*—Galen L. Barefoot
*Attorney, Agent, or Firm*—Barnes & Thornburg

[57] ABSTRACT

A free flyable structure includes a wing formation (2) including an inflatable container of such form that when it is inflated the container (2) has an aerofoil shaped cross-section whereby relative displacement between the container and surrounding air enables free flight conditions. A substantially rigid means (19) carries the pay load from the wing formation (2). Flight path control of the flyable structure includes producing relative displacement between the load and wing formation. Additional flight path controls may be used. A canard wing assembly (82) is suggested. The structure is power driven and in the disclosure a power unit (85) having a propeller (86) is proposed.

9 Claims, 13 Drawing Figures

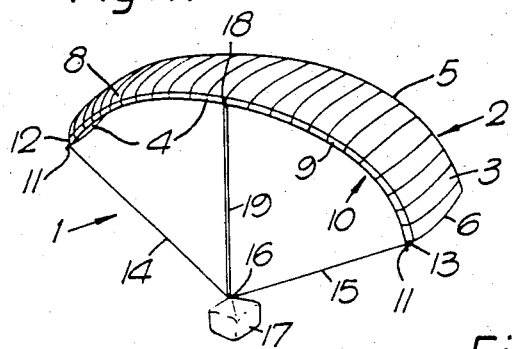
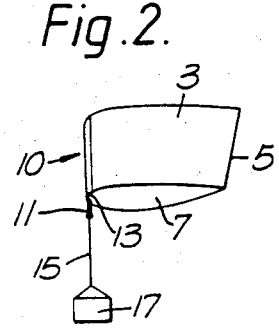
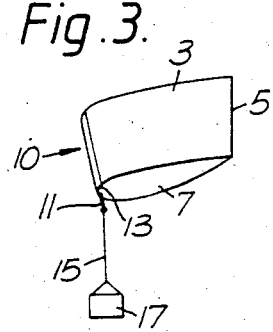
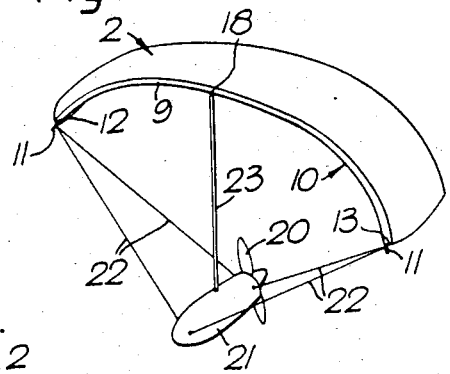
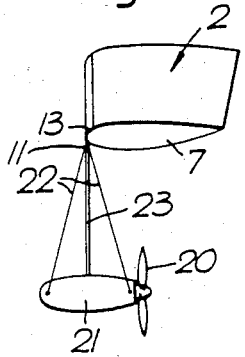
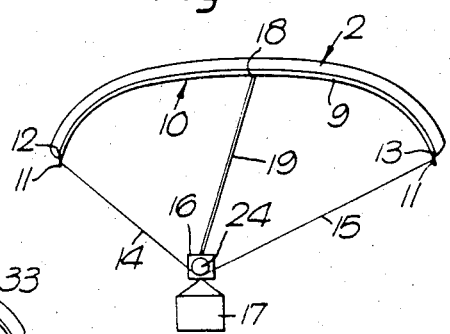
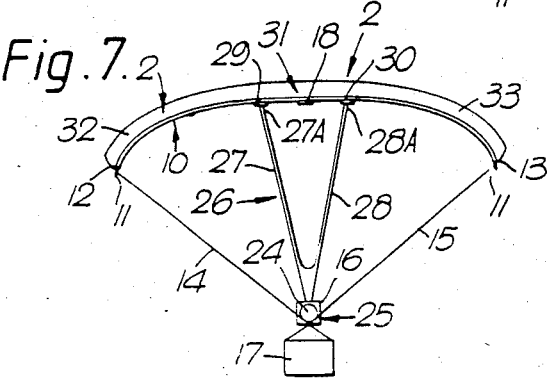

FREE FLYABLE STRUCTURE

This invention relates to flyable structures.

Broadly, according to the present invention there is provided a flyable structure including an inflatable container of such form that when it is inflated the container provides an aerofoil shaped cross section whereby relative displacement between the container and surrounding air produces lift; and substantially rigid means for supporting a load from the container.

A second aspect of the invention provides a flyable structure including an elongate container which is inflatable so as to provide a pressurised body having a leading and trailing edge region, and being capable of producing aerodynamic lift on relative displacement of the body and the surrounding air; stiffening means for maintaining at least the leading edge region of the body in a spread out condition, the stiffening means having predetermined deformation charateristics which are utilisable in controlling the overall shape or profile of the container during flight conditions; substantially rigid means for supporting a load from the body.

Preferably, the load support means connects, at least in part, with the leading edge region of the body.

Conveniently, means are provided for enabling controlled changes or variations in the aerodynamic characteristics of the container to enable selective control of the flight path of the structure.

In a particular embodiment of the invention the control of the flight path is arranged to be effected by adjusting the position of the effective weight of the load with respect to the aerodynamic centre of lift of the structure.

Preferably, the adjustment of the weight position is effected by displacement of the load with respect to a mounting unit supported from the remainder of the structure.

In further embodiments facilities may be provided for enabling powered flight. In such cases arrangements may be made for enabling remote control of the powered drive for enabling local control in the case of manned flight.

Furthermore, positionally adjustable control surfaces may be provided for the purposes of controlling the flight path of the structure such as heading, descent, climb etc.

In a particular arrangement a canard wing formation can be provided the wing formation having an adjustable setting elevator part to allow contol of climb and descent.

For a better understanding of the invention and to show how to carry the same into effect reference will now be made to the accompanying drawings in which:

FIG. 1 is a schematic representation of a flyable structure incorporating the features of the invention;

FIG. 2 is an end view of the structure of FIG. 1 when the structure is aligned at a first angle of attack during flight;

FIG. 3 is an end view of the structure of FIG. 1 when the structure is aligned at a second angle of attack during flight;

FIG. 4 is a schematic representation of a second embodiment of a flyable structure incorporating the features of the present invention;

FIG. 5 is an end view of the structure of FIG. 4 when the structure is aligned at said first angle of attack during flight;

FIG. 6 is a front view of the structure of FIG. 1 illustrating a position of a load relative to the remainder of the structure during a control operation involving load displacement;

FIG. 7 is a front view of a further embodiment of a flyable structure incorporating the features of the invention;

Figure 8:
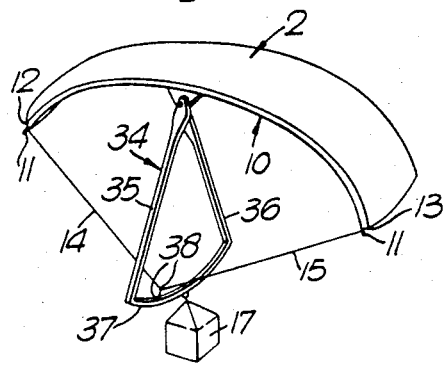
Figure 9:
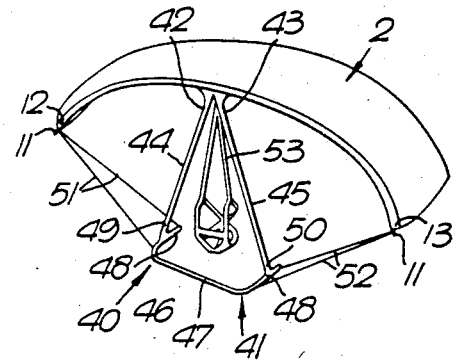
Figure 10:
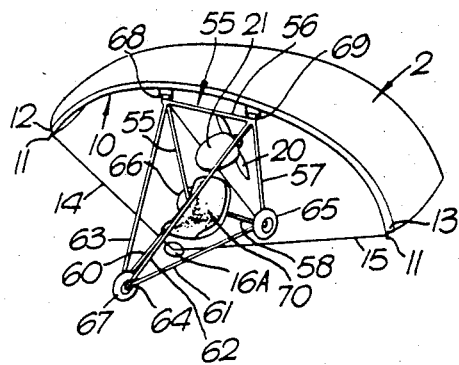
Figure 11:
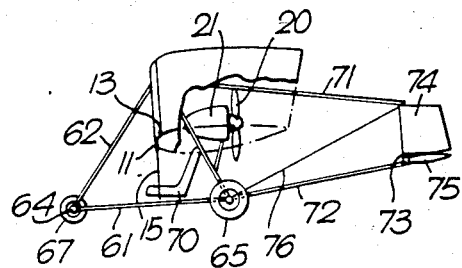
Figure 12:
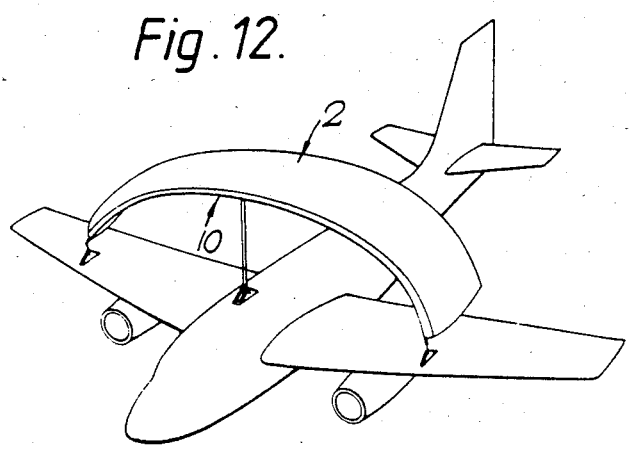
Figure 13:
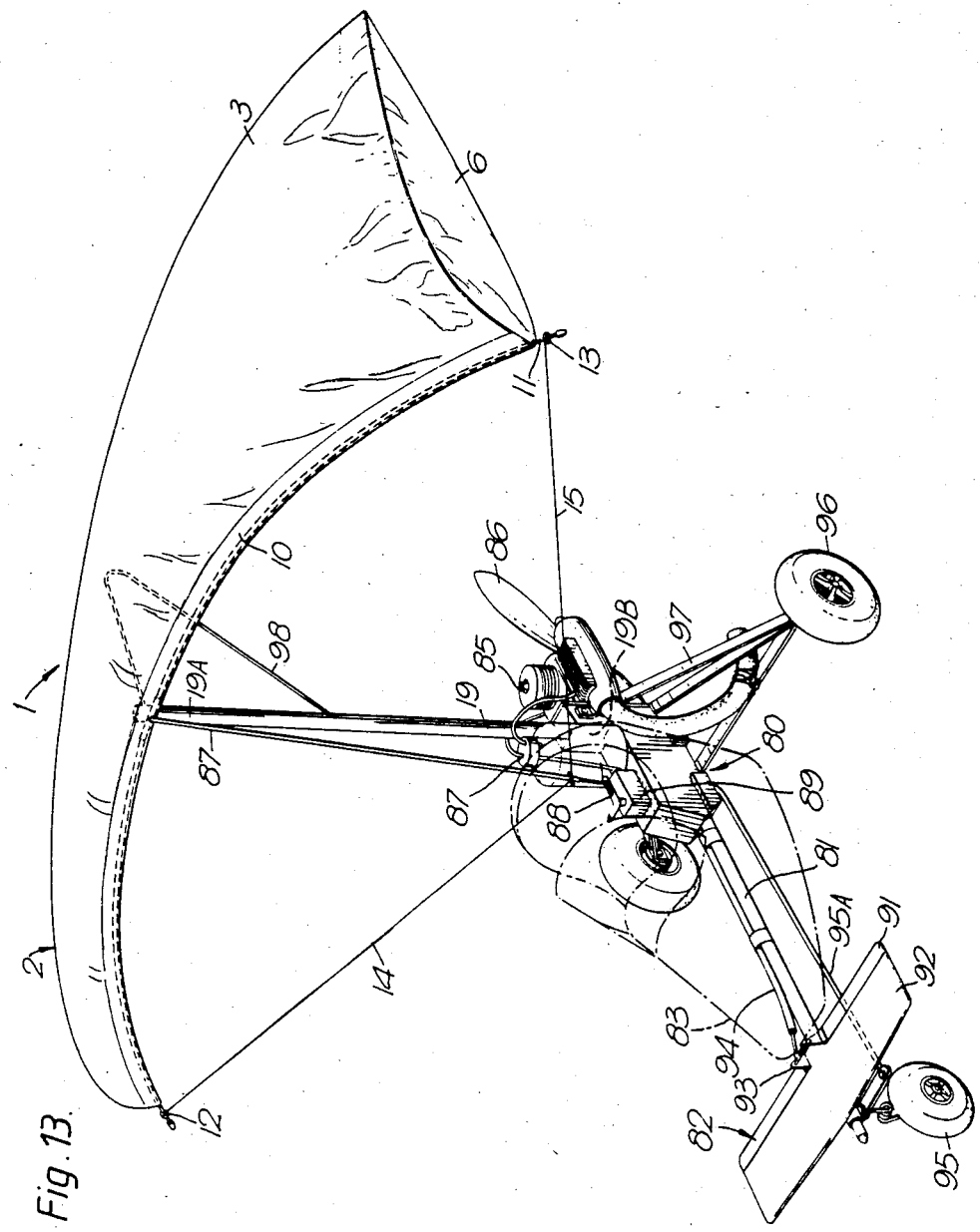

FIGS. 8, 9, and 10 are views of still further embodiments of the flyable structure of the invention;

FIG. 11 is a schematic side view of a further embodiment of the flyable structure of the invention;

FIG. 12 schematically illustrates a combination of structure of the invention with a conventional aircraft;

FIG. 13 is a view of a more detailed representation of a structure of the invention, the Figure showing the use of additional flight control arrangements.

Referring now to FIGS. 1 to 3 of the drawings these show a first embodiment of a flyable structure incorporating the features of the invention; the flyable structure 1 comprising a wing formation 2 which comprises a generally rectangular container or envelope including a top sheet or skin 3, a bottom sheet or skin 4 which are connected to each other along a longer edge 5 that is to provide the trailing edge region of the container and at the ends 6 by walls 7 which are shaped so as to provide an aerofoil like form to the container or body. The remaining longer edge regions 8 of the top and bottom sheets 3 and 4 are interconnected by way of a front wall 9 which provides an air inlet for ram air to enter the interior of the wing formation 2 and which effectively forms the leading edge region of the wing formation.

The interior of the wing formation 2 is divided into separate cells or sub-chambers by intermediate aerofoil shaped walls (not shown) which are arranged to be generally parallel to the end walls 7.

The wing formation top and bottom sheets and the intermediate walls are generally impervious to air so that any air entering through the front wall region 9 will pressurise that is inflate the wing formation.

The leading edge region of the wing formation is intended to be braced into a spread out condition by means of a bracing or stiffening means 11 which can engage in or with a stiffening means mounting arrangement which can include a sleeve for receiving the stiffening means when the latter is in the form of a spar or the like.

The stiffening means 11 is such that it is able to flex sufficiently for the leading edge region 10 of the wing formation to be deformed into a predetermined curved or bowed profile as seen in the direction looking from the leading edge region to the trailing edge region of the wing formation 2.

In other words the stiffness of the stiffening means 11 is selected such that by pulling the ends thereof towards each other the leading edge region 10 deforms into a curved shaped which according to the deformation characteristics of the stiffening means will either be a generally uniformly smooth deformation or a profile having a predetermined shape i.e., a relatively flat central poration and relatively sharply curved ends. It will be apparent that by deforming the stiffening means a corresponding shape is induced into at least the leading edge region of the wing formation.

On advancing the deformed wing formation 2 with the leading edge region facing forwards it will be found that even at relatively low velocities of, for example, 4 or 5 knots the wing formation will be inflated and thus pressurised. Because of the aerofoil form of the end walls 7 and the intermediate walls the wing formation will assume an overall aerodynamic aerofoil form whereby flow of air over the upper and lower sheets 3 and 4 will create the requisite force conditions for producing lift.

In view of this aerodynamic lift property and having regard to the various forces involved in the production of lift it is a common practice in aerodynamics to presume that the effective lift forces can be replaced by a single lift force vector passing through a position of the wing formation called the centre of lift.

The stiffening means 11 can conveniently be deformed into the required profile by means of lines, stays or the like 14,15 which are respectively attached to the ends 12 and 13 of the stiffening means 11, and which are themselves secured to each other or to a connection node or to any other suitable location means.

Since it is required that the wing formation should carry a load 17, for the purposes of the description in connection with FIGS. 1 to 3, this load will be regarded as being connected to the node 16, i.e., effectively to the joint between the lines 14 and 15.

As so far described it will be noted that the load is symmetrically supported with respect to the leading edge region 10 of the wing formation 2. In other words the resultant vertical force component of the load 17 will pass through the line of symmetry of the wing formation 2 i.e., the geometrical centre 18 of the leading edge region. Also since the load is suspended beneath the wing formation 2 the effective centre of gravity of the flyable structure will be located at a point beneath the centre of lift of the wing formation 2.

In this specification the term effective centre of gravity is intended to represent the effective centre of the vertical force components acting in a downwardly direction, i.e., weight of the load, and wing formation and the like.

A particular characteristic of the flyable structure of the invention is that the principal weight or load of the structure will normally be connected to the leading edge region 10 of the wing formation, and that any relative displacement of the effective centre of gravity relative to the centre of lift provides a flight direction control parameter.

For practical purposes it is convenient to consider that the leading edge region extends from the actual leading edge back towards the trailing edge region for approximately one third of the distance between leading and trailing edges of the container 2.

Referring once more to FIG. 1, with a view to setting positively the maximum distance of the load from the central region 18 of the leading edge region 10, the the load 17 is connected to the suspension region by way of a strut which is at least semi-rigid or similar member 19. It will be understood that this strut serves to transmit at least a part of the load forces to the wing formation 2.

FIG. 2 schematically illustrates a side view of the structure of FIG. 1 when the wing formation thereof is in a level flight condition or attitude.

FIG. 3 schematically illustrates the structure of FIG. 1 and of FIG. 2 when the wing formation is set at an angle of attack characteristic of a glide type of flight condition.

In order to arrive at the orientation shown the forces acting upon the wing formation, i.e., lift, drag, load weight, nature of the load, speed etc., have caused the wing formation to self adjust to the optimum conditions in that the resultant forces vector is along, that is contained in, a vertical plane including the lines 14 and 14. It should be noted that this condition does not necessarily imply that the line or strut 19 is vertical.

In other words the flight angle or angle of attack of the wing formation automatically adjusts itself to accomodate the overall effects of the various forces acting thereupon.

Referring now to FIGS. 4 and 5, these schematically illustrate in a highly simplified form a flyable structure which is power propelled by a propellor 20 driven from a motor 21 which is supported from the leading edge region 10 of the wing formation 2 by way of a support arrangement such as a group of support lines 22 which are so connected that the motor 21 is set to a generally horizontal setting, and which is such that a vertical strut 23 connecting with the centre 18 of the leading edge region connects essentially with the centre of gravity of the motor 21.

In operation, it is believed that, assuming that any air flow over the wing formation is from left to right of the Figure, the overall resultant of the various forces acting upon the flyable structure, i.e., the force couple arising from the horizontal components of thrust at engine level, wing formation drag, the weight of the load, the lift forces, the angle of attack and so forth will cause the wing formation to set into a particular angle of attack which will vary according to the force resultant and the nature of the various forces forming the resultant.

So far the sole reference to the matter of directional steering of the flyable structure has been limited or restricted to the suggestion that steering can be controlled according to the relative position of the weight or load with respect to the vertical plane containing the centre of lift or leading edge region of the wing formation. Other possibilities will be mentioned hereinafter. However, in so far as weight position adjustment is concerned the control of steering by this method will be briefly examined in relation to FIG. 6 which can conveniently be regarded as a front view of the arrangements of FIGS. 1 to 3 with, however, the addition of means 24 at the connection node 16 for enabling relative displacement of the load with respect to the vertical plane containing the centre 18 of the container leading edge region 10.

In a simple embodiment the means 24 can be regarded as a pulley unit 25 around which the lines 14 and 15 are wrapped such that rotation of the pulley unit 25 produces a shortening of one of the lines 14,15 simultaneously with an increase in the length of the other one of the lines 14,15. In other words, the portions of the lines 14,15 on the pulley are wrapped capstan fashion. The pulley unit may be controlled in any suitable manner i.e., motor driven by a remotely controllable motor (not shown in FIGS. 4 and 5)

On operating the pulley unit 25 the load is effectively displaced to one side or the other side of the vertical plane containing the centre 18 of the wing formation leading edge region 10. This has the effect of so adjusting the relative settings of the lines 14 and 15 and the strut 19 with respect to the vertical plane previously mentioned that tension components are induced into the lines 14,15 and the strut 19 which are unbalanced or asymmetric as compared to the tensions prevailing prior to the displacement of the load and which so act upon the stiffening means 11 as to change the deformation shape of the stiffening means and thus a corresponding change in the shape of the wing formation. This in turn causes a resultant variation in the lift forces acting upon the wing formation and thus a change in the flight conditions.

With the position as shown in FIG. 6 the result of the displacement of the load 17 into the position shown is that the lift forces acting upon the wing formation to the right of the vertical plane containing the centre of gravity of the load are greater than those acting to the left of said plane.

Consequently, the wing formation will tend to move towards the left thereby changing a straight flight path to a flight path along a further direction.

Clearly, a displacement of the load in the reverse sense will produce a directional change in the opposite direction.

Turning now to a second important mode of controlling the flight path of the flyable structure namely, causing the structure to climb or descent; this control function can in general terms be effected by changing the position of the load centre of gravity with respect to the wing formation along the fore and aft direction of the wing formation. This load position variation, in practice, adjusts the angle of attack of the wing formation 2.

This load position adjustment can be conveniently effected by mounting the load for position displacement along a track arrangement (not shown) extending in the fore and aft direction of the wing formation, and by providing, for example, motorised means (not shown) which can be remotely controlled for controlling the displacement.

Referring now to FIG. 7 in the embodiment of this Figure the central strut 19 discussed in relation to previous Figures is replaced by a frame arrangement 26 including two struts 27,28 interconnected at their lower ends at the connection node 16 and whose upper ends 27A and 28A connect with the leading edge region 10 at two locations 29 and 30 spaced to either side of the wing formation leading edge region centre 18. The locations, 29, 30 effectively define a central portion 31 to the wing formation which is substantially rigid, i.e., flexure of the leading edge stiffening means 11 is at least substantially prevented between the connection locations 29 and 30 whereby all operative control of the flight flexure takes place in the portions 31 and 33 of the wing formation to either side of the strut connections 29 and 30.

In other words the effect of the shortening and lengthening of the lines 14 and 15 as a result of operation of the pully unit 25 is to deflect the portions 32 and 33 relative to the central portion.

As will be seen from FIG. 7 the flight directional movement pulley unit 25 is located in the vicinity of the connection between the lower ends of the struts 27 and 28. It will be clear that the directional control pulley unit is positionally fixed distance wise with respect to the central section 31 by the struts 27 and 28 so that any operation of the pulley unit is such as to cause immediate relative displacement of the wing formation end portions 32 and 33 with respect to the central portion 31.

The load 17 to be carried is mounted to the underside of the strut connection node 16 and since, as previously mentioned, positional movement of the load in the fore and aft directions provides a control parameter or function for the variation of the angle of attack of the wing formation 2 during flight arrangements are made for enabling the requisite selective positional adjustment.

Turning now to the arrangement of FIG. 8 in this embodiment the generally inverted triangular strut arrangement of FIG. 7 is replaced by a quadrant system 34 comprising two side parts 35 and 36 forming struts of the flyable structure and a curved, i.e., part circular, base part 37 which is directed generally in the fore and aft direction of the wing formation 2.

The load 17 is supported from the quadrant base part 37. The connection between the load and the base part 37 can be such as to allow relative movement along the length of the quadrant base part.

The upper end of the quadrant system 34 is connected to the central region 18 of the leading edge region 10. The connection is such that the whole wing formation can pivot about an axis generally aligned in said fore and aft direction relative to the quadrant system. If desired, this connection can comprise a universal form of pivot to enable relative movement in any direction with respect to the wing formation.

A further possibility is that the connection is not a pivotal connection so that the flight control would reflect the condition of the wholewing formation being subjected to flexure change.

The tie lines 14 and 15 for the end regions of the wing formation leading edge are connected to the quadrant base 37 at the point 38. Conveniently, the connection will include a pulley unit 25 whereby the end regions of the wing formation can be positionally controlled with respect to the quadrant to effect directional change.

It will be appreciated that since the quadrant system 34 carries the load 17, and since this load will provide the greater part of the weight of the flyable structure any operation of the pulley unit 25 will produce a corresponding change in the shape of the wing formation and can be positionally controlled with respect to the quadrant to effect directional steerage of the structure.

Various possibilities for the adjustments to the effective lengths of the lines will be considered hereinafter. For example, actual change in length or displacement of the node 16 from a position immediately beneath the centre 18 of the leading edge which may be regarded as displacing the load relative to the wing.

It will be appreciated that in a construction in which the quadrant system is fixed (i.e., not pivoted) with respect to the wing formation the adjustments to the lines 14 and 15 will mainly deflect the end regions of the wing formation relative to the remainder of the wing formation.

For the purposes of adjusting the angle of attack it is possible to vary the fore and aft position of the load as discussed hereinbefore. However, the provision of the quadrant makes it possible to introduce a further mode of varying the angle of attack. In this second mode the position of the attachment point 38 is arranged to be selectively displaceable lengthwise of the quadrant base 37. Such displacement may be made by manual or motorised controls. In the latter case remote control arrangements may be provided for the control of the motor during flight.

It will be appreciated that in the case of manned flight the load would include the weight of the user (s), and that such manned flight can be power or non-power driven.

FIG. 9 schematically shows how the structure of FIGS. 1 to 3 may be modified to enable manned flight.

In the FIG. 9 arrangement a space frame unit 40 replaces the strut 19, the unit 40 including a base section 41 connected to the central region 18 of the leading edge region 10 by way of the upper ends 42 and 43 of bars 44 and 45. The base section 41 comprises a generally U-shaped element 46 including a base 47 and two arms or limbs 48. The limbs 48 are connected to the lower ends 49 and 50 of the bars 44 and 45. The frame unit 40 is supported from the wing formation by two pairs of lines or struts 51 and 52 in such manner that the base 47 forms the leading part of the unit 40 with the limbs directed rearwardly, and also such that the frame unit lies substantially horizontal when the wing formation is symmetrically positioned with respect to the horizontal.

The connection between the bars 44 and 45 and the base section 41 can be such that when the plane of the unit is horizontal the bars 44 and 45 lie in a vertical plane, or alternatively the bars may be inclined to the vertical plane in a rearwardly direction so that the leading edge region 10 of the wing formation 2 is positioned to the rear of the leading part of the frame unit 40.

A user support harness or the like 53 is suspended from the upper end regions of the bars 44 and 45 or other location closely adjacent thereto by a mounting shackle arrangement 54. The positioning and form of the harness can be such that the user is suspended in a manner similar to the user of the so-called 'Hang Glider' and such that he is able readily to grasp the limbs 48 to use them as a means whereby he is able readily to displace his weight relative to the wing formation 2 in selected directions fore and aft and transversely of the fore and aft direction of the wing formation, for the purposes of controlling the flight of the flyable structure.

In practice, by adjusting his weight in the fore and aft direction the user can selectively alter the angle of attack, and by adjusting his weight in the side-to-side direction relative to the central vertical plane of the wing formation that latter is cause to turn to the required direction.

It will be appreciated that during an actual flight the user wll be making various combinations of weight displacement movements so that, in practice, the wing formation may well be subjected to a relatively complex group of forces, deformations or distortions which lead to the required relative movement between the load and wing formation.

Referring now to FIG. 10, the frame unit essentially comprises a rectangular portion 55 including struts 56, 57, 58, and 59. Struts 60, 61, 62 and 63 are connected as shown to the corner regions of the portions 55 and also at their other ends to a common connection point or node 64. Conveniently, the end regions of the lower strut 58 and the struts node 64 can be used for the mounting of road running wheels 65, 66 and 67 to thereby provide the facility of an aircraft undercarriage It will be noted that the struts 58, 60 and 61 will thus be in a horizontal plane.

The rectangular frame 55 lies in a plane which is tilted forwardly with respect to the vertical so that the upper strut 56 is located intermediate the lengths of the struts 60–63.

The leading edge region 10 is connected by way of pivot connections 68 and 69 to the upper corners of the frame 55. The lines 14 and 15 connect the end regions of the wing formation leading edge and the stiffening means 11 to a connection position 16A at a location lying in the vertical plane including the lines connections and pivot connections 68 and 69 whilst the wing formation set for straight flight.

A user seat unit 70 is mounted from the struts so as to be generally in the plane containing the leading edge region 10.

As has been previously discussed the directional control is effected by the relative displacement of the junction of the lines 14 and 15 to produce the relative flexure of the end portions of the wing formation. This displacement can be by means of a joy-stick system (not shown) which is arranged to be able to produce the requisite displacement for directional control and also the fore and aft movement for the purposes of varying the angle of attack.

Referring now to FIG. 11 this illustrates a modification of the structure shown in FIG. 10. In FIG. 11 additional struts which extend to the rear of the previously described framewotk 55 are used to mount positionally adjustable flight control surfaces. Thus the embodiment includes additional struts 71 and 72 which carry a support 73 for a rudder and elevator 75. Control lines 76 (only one shown) are provided for enabling selective movement of the control surfaces. These control lines 76 connect with the conventional joy-stick system for the elevator and rudder bar or the like for the rudder. Alternatively the control arrangement may include a canard wing arrangement.

It will be understood that any motor drive will be capable of variable speed adjustment.

Furthermore, it will be appreciated that the control of the control surfaces and the motor speed variation can be effected by remote operation such as by radio control.

It will be noted from the above discussions that a major factor in the control of the flight of the flyable structure is be the effective selective displacement of the centre of gravity of the structure's load relative to the centre of lift and that such control can be augmented or replaced by, under certain situations, the provision of additional control surfaces which are positioned at suitable (in aerodynamic terms) locations with respect to the leading edge region 10 of the wing formation. It will also be appreciated that a matter of importance is the ability of the stiffening means 11 to maintain the sheets of the wing formation in the required extended aerofoil condition.

A further application of the flyable structure of the invention, and particularly of the embodiment of FIGS. 1 to 3 is to the creation of extra lift to a conventional fixed rigid winged aircraft by, in effect, mounting the flyable structure of the present invention in a pickback arrangement with the wings of the conventional aircraft, whereby the latter acts as the load for the wing formation and thus the flyable structure. With this arrangement additional lift is provided at the take-off period of the conventional aircraft. After a desired height has been attained the structure of the invention is jettisoned. This concept is very schematically shown in FIG. 12.

Referring now to FIG. 13, this schematically shows a flyable structure comprising a radio controllable propellor driven aircraft. In the structure shown the load 17 may be considered to incorporate, as will be discussed hereinafter, a motor drive unit, remotely operable control arrangements for the motor drive unit and any other components involved in the construction plus any 'pay-load' i.e., the user of a structure in the case of a manned flight.

For convenience those components that have previously been specifically identified with reference numerals in previous Figures will be identified by the same references in FIG. 13.

Thus in FIG 13, the structure shown therein incorporates the wing formation 2 and associated stiffening means 11, the lines 14, 15 and the king post 19. The king post is is pivotally connected at its upper end 19A to the central rgion 18 of the container leading edge region 10, and at its lower end 19B to the load 17. The load is regarded as including a main frame section 80 which serves to mount the drive arrangements of the structure 10 (to be discussed hereinafter), a forwardly directed main spar 81 carrying at its forward end a canard wing assembly 82 and the above mentioned 'pay-load' which in the Figure is very schematically shown as a housing 83, for enclosing the main spar structure and for providing a simulated cock-pit region.

The drive drive arrangement for the flyable structure basically includes a power unit 84 including a liquid fueled internal combustion engine 85 driving a propeller 86 operating in pusher mode. In the arrangement shown the fuel tank 87 for the power unit is mounted to the top of the main frame. The conventionally provided fuel lines are not shown in the Figure. The power unit is of a variable speed and is controlled by a throttle control servo unit (not shown) which is in turn controlled by a radio control unit including a radio receiver/transmitter unit and associated power supplies (not shown) The radio control unit and servo units are mounted to the main frame.

In the arrangement of FIG. 13 the previously mentioned control means 24 includes a second strut or like element 87 which is pivotally connected to the upper end 19A of the king post 19 and at its lower end 87B to the free end of a lever 88 pivotally movable about an axis substantially parallel to that of the king post 19 the lever 88 being swingable about its axis under the control of a servo control element 89 included in the structure control arrangements and mounted to the main frame section 80.

This servo control unit is under the operational control of the radio control unit. For convenience, the operation of the lever 88 and the associated servo unit 89 are externally mounted to the main frame.

The ends of the lines 14, 15 also connect with the end of the lever 88 whereby the latter point of connection forms the previously mentioned node 26 so that the pivotal displacement of the lever 88 produces a displacement of the node with respect to the main frame section 80 and thus the remainder of the load. Consequently, upon movement of the lever 88 pull is exerted on one or the other of the lines 14 and 15 whereby the container tilts with respect to the king post 19 according to the direction of displacement of the lever 88 about the king post with the extent of tilt related to the extent of pivotal movement of the lever 88.

The canard wing assembly 90 includes an elevator surface 91 and a positionally adjustable control surface 92 whose angular setting to the horizontal controls the climb and descent of the flyable structure. The elevator surface connects with a control lever or the like 93 which is selectively movable by way of a control connection 94 with a control servo unit (not shown) mounted to the main frame and operable by the radio control unit.

The structure is mounted upon a nose wheel 95 steerably connected with the leading edge of the main spar 81 and fixed wheels 96 carried by mounting struts 97 extending from each side of the main frame. The steering of the front wheel is effected by way of a control linkage which couples the nose wheel movements to the movements of the lever 88. This particular control is particularly utilised during taxiing of the flyable structure.

It will be understood from the above discussion that the container needs to be made from a material which enables the flexing of the container during use and which will also enable the selection of a desired flight profile. For small aircraft for example wing spans of 1 to 10 meters a material commonly known as Rip Stop Nylon has been considered suitable. (Nylon is a Registered Trade Mark). Other materials exhibiting corresponding strength, flexibility and imperviousness to passage of air may be used.

If it is desired to increase the overall lift it is possible to use one or more additional wing formations which is or are arranged in stacked formation above the wing formation actually coupled to the king post. Any such additional wing formations would be attached by way of connections between the end regions of the stiffening means of successive wing formations. With this arrangement any such additional wing formations wll be caused to move with i.e., displace, flex or the like with the wing formation attached to the king post and lines 14, 15. If desired the lines 14 and 15 may me extended so as to be connectable to the stiffening means of all of the wing formations used.

From the above it will be seen that the invention provides a free flyable structure in which the wing formation, the king post and the load provide what is essentially a composite construction in that the wing formation is maintained at the leading edge region thereof at a predetermined distance away from the load, whereby the leading edge region cannot collapse towards the load. Bearing in mind the use of the propeller 86 a support bracket 98 is provided for holding the trailing edge regions of the container or containers away from the propeller whilst it is in a preflight collapsed condition in the case of ram air fillable i.e., pressurisable containers.

We claim:

1. A flyable structure comprising: wing formation including an air inflatable elongate container having a leading edge region and a trailing edge region, the container being of such form that when inflated it provides an airfoil cross-section whereby relative displacement between the container and surrounding air produces aerodynamic lift; elongate means for supporting and maintaining the leading edge region in an extended condition while leaving the trailing edge region unsupported; a king-post arrangement for supporting a load below the wing formation, the king-post arrangement having a lower end to which the load is connected and an upper end connected to the center of the elongate means and thus the leading edge region of the wing formation by way of a pivotal connection which allows for relative tilt between the wing formation and the king-post arrangement; and means for controlling the flight path of the structure by producing relative tilting movement between the wing formation and the king-post arrangement, the flight path control means including control connections co-operating with the opposite ends of the leading edge region of the wing formation, and control connection adjustment means for selectively varying the relative positions of the ends of the leading edge regions relative to the load for the purpose of producing said relative tilt, the control connection adjustment means being mounted to the structure at a location spaced downwardly of the pivotal connection.

2. A flyable structure as claimed in claim 1, and in which the control connections comprise first and second lines, stays or the like which are respectively connected at one end thereof to said opposite end regions of the elongate member and which are at their other ends effectively connected together at the control connection adjustment means, the latter being located in the vicinity of the lower end of the king-post arrangement.

3. A flyable structure as claimed in claim 2, in which the first and second lines, stays or the like are utilized to deform the elongate member into a curved profile which provides a required flight profile for the leading edge region of the wing formation.

4. A flyable structure as claimed in claim 3, and in which the control connection adjustment means includes a strut having an upper end and a lower end, a pivotal connection between the upper end of the strut and the wing formation, means for connecting the first and second lines, stays or the like with the lower end of the strut, and means for enabling selective displacement of the strut lower end with respect to the king-post arrangement in such manner that a related flight path control tilt is produced between the wing formation and the king-post arrangement thereby enabling control of the flight path of the flyable structure.

5. A flyable structure as claimed in claim 4, and including a lever mounted for pivotal movement about an axis substantially parallel to that of the king-post arrangement, said lever also being pivotally connected to the lower end of the strut, there being a servo control arrangement included in said control means for producing selective pivoting of the lever with respect to the king-post arrangement and thus a consequential movement of the strut which produces said flight path control relative tilt.

6. A flyable structure as claimed in claim 4, and including wheels mounted to the structure for enabling taxiing of the structure, means for enabling steering movements of at least one of the wheels, and a control connection between the steerable wheel and the control adjustment means 7. A flyable structure as claimed in claim 1, and comprising positionally adjustable flight control surfaces for facilitating the control of the flight path of the flyable structure, said flight control surfaces not being on the wing formation.

8. A flyable structure as claimed in claim 6, and in which said positionally adjustable control surfaces include a canard wing assembly incorporating an elevator surface whose setting with respect to the remainder of the canard wing assembly serves to control the climb and descent of the flyable structure.

9. A flyable structure as claimed in claim 3, and in which the means for producing said relative displacement includes a power drive unit including a propeller operating in a pusher mode.

* * * * *